United States Patent
Lesage et al.

(10) Patent No.: US 8,325,416 B2
(45) Date of Patent: Dec. 4, 2012

(54) RE-WRITEABLE OPTICAL ELEMENT AND A DISPLAY, REFLECTOR AND BACKLIGHT INCORPORATING THE SAME

(75) Inventors: Etienne Lesage, Franconville (FR); Jonathan Mather, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 1255 days.

(21) Appl. No.: 11/760,246

(22) Filed: Jun. 8, 2007

(65) Prior Publication Data

US 2007/0285775 A1    Dec. 13, 2007

(30) Foreign Application Priority Data

Jun. 13, 2006  (GB) .................................. 0611655.2

(51) Int. Cl.
G02B 27/22   (2006.01)
G03H 1/26    (2006.01)

(52) U.S. Cl. ......................... 359/462; 359/23
(58) Field of Classification Search ............... 359/465
See application file for complete search history.

(56) References Cited

U.S. PATENT DOCUMENTS

| | | | |
|---|---|---|---|
| 2,053,173 A | 9/1936 | Astima | |
| 2,689,387 A | 9/1954 | Carr | |
| 3,031,351 A | 4/1962 | McIlvaine | |
| RE27,617 E | 4/1973 | Olsen | |
| 4,283,113 A | 8/1981 | Eden | |
| 4,764,410 A | 8/1988 | Grzywinski | |
| 4,766,023 A | 8/1988 | Lu | |
| 5,147,716 A | 9/1992 | Bellus | |
| 5,227,905 A * | 7/1993 | Clark et al. .................. 349/172 |
| 5,296,439 A | 3/1994 | Maruyama et al. | |
| 5,418,640 A * | 5/1995 | Hood ............................ 359/265 |
| 5,528,319 A | 6/1996 | Austin | |
| 5,608,568 A | 3/1997 | Blodgett et al. | |
| 5,825,436 A | 10/1998 | Knight | |
| 5,831,698 A | 11/1998 | Depp et al. | |

(Continued)

FOREIGN PATENT DOCUMENTS

| | | |
|---|---|---|
| EP | 0 395 113 | 10/1990 |
| GB | 2 405 533 | 3/2005 |
| GB | 2 421 346 | 6/2005 |
| GB | 2 410 116 | 7/2005 |
| GB | 2 413 394 | 10/2005 |

(Continued)

OTHER PUBLICATIONS

S. Yamamoto et al.; "Rewritable Paper Using Leuco Dyes: Coloring/Decoloring Effects of Long-chain Alkyl Group;" IDW/AD '05; pp. 851-854.

*Primary Examiner* — Jade R Chwasz
(74) *Attorney, Agent, or Firm* — Renner, Otto, Boisselle & Sklar, LLP

(57) ABSTRACT

An optical element (22) comprises a material (27) thermally switchable between a first stable state and a second stable state different from the first state and a switching mechanism (28a-28c) for switching one or more selected areas of the material (27) between the first state and the second state thereby to change the transmissivity of one or more selected areas of the optical element (22). The optical element may be placed in an optical path through another component such as, for example, a display (21), reflector or backlight, such that the optical element may be controlled to change the optical properties of the component. The properties that may be changed include, but are not limited to, the display mode of a display (21), viewing angle range, brightness/luminance, and color.

45 Claims, 9 Drawing Sheets

| U.S. PATENT DOCUMENTS | | | |
|---|---|---|---|
| 5,877,829 A | 3/1999 | Okamoto et al. | |
| 6,211,930 B1 | 4/2001 | Sautter et al. | |
| 6,445,434 B2 | 9/2002 | Takato et al. | |
| 6,552,850 B1 | 4/2003 | Dudasik | |
| 6,987,550 B2 | 1/2006 | Takato et al. | |
| 6,989,880 B2 | 1/2006 | Takato et al. | |
| 2002/0158967 A1 | 10/2002 | Janick et al. | |
| 2004/0240777 A1* | 12/2004 | Woodgate et al. | 385/16 |

| FOREIGN PATENT DOCUMENTS | | |
|---|---|---|
| JP | 04-265989 A | 9/1992 |
| JP | 10-253997 A | 9/1998 |
| JP | 2003-154778 A | 5/2003 |
| JP | 2003-233074 | 8/2003 |
| JP | 2005-070353 A | 3/2005 |
| JP | 2005-258013 A | 9/2005 |
| WO | 95/11127 | 4/1995 |

* cited by examiner

FIG. 4-a
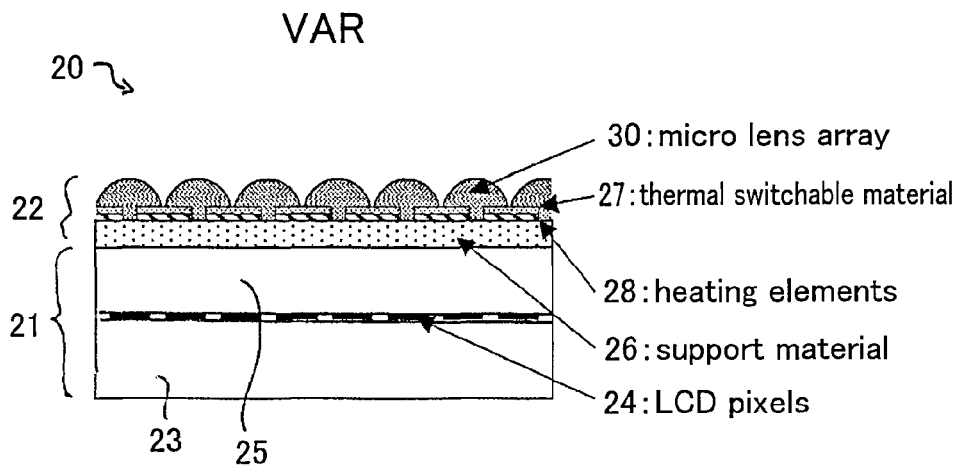
FIG. 4-b
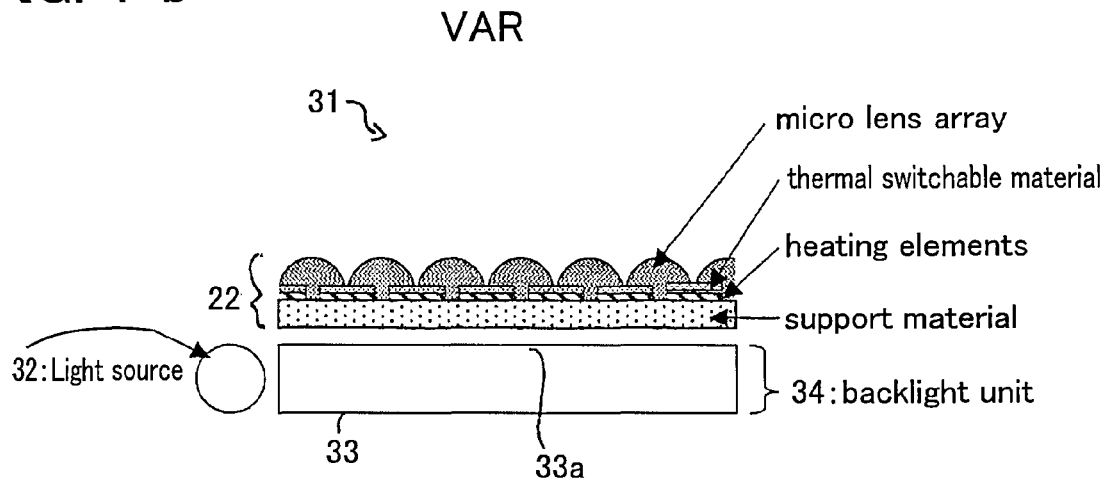

How to pattern the TR material (1/2)

Heater

UV switching material based on thermal rewritable material

RE-WRITEABLE OPTICAL ELEMENT AND A DISPLAY, REFLECTOR AND BACKLIGHT INCORPORATING THE SAME

This Nonprovisional application claims priority under 35 U.S.C. §119(a) on Patent Application No. 0611655.2 filed in Great Britain on Jun. 13, 2006, the entire contents of which are hereby incorporated by reference.

FIELD OF THE INVENTION

The present invention relates to a re-writeable optical element which may be re-written so as to change the transmissivity of part, or all, of the element. The optical element may be placed in the optical path through another component, such as for example a display, such that the optical element may be controlled to change the optical properties of the component. Such an optical element may be used, for example, with a display to define a switchable parallax barrier so that the display can be switched between a 2-D display mode and an autostereoscopic display mode or a dual view display mode. The invention also relates to a display, reflector or backlight incorporating such an optical element.

BACKGROUND OF THE INVENTION

For many years conventional display devices have been designed to be viewed by multiple users simultaneously. The display properties of the display device are made such that viewers can see the same good image quality from different angles with respect to the display. This is effective in applications where many users require the same information from the display—such as, for example, displays of departure information at airports and railway stations. However, there are many applications where it would be desirable for individual users to be able to see different information from the same display. For example, in a motor car the driver may wish to view satellite navigation data while a passenger may wish to view a film. These conflicting needs could be satisfied by providing two separate display devices, but this would take up extra space and would increase the cost. Furthermore, if two separate displays were used in this example it would be possible for the driver to see the passenger's display if the driver moved his or her head, which would be distracting for the driver. As a further example, each player in a computer game for two or more players may wish to view the game from his or her own perspective. This is currently done by each player viewing the game on a separate display screen so that each player sees their own unique perspective on individual screens. However, providing a separate display screen for each player takes up a lot of space and is costly, and is not practical for portable games.

To solve these problems, multiple-view directional displays have been developed. One application of a multiple-view directional display is as a 'dual-view display', which can simultaneously display two or more different images, with each image being visible only in a specific direction—so an observer viewing the display device from one direction will see one image whereas an observer viewing the display device from another, different direction will see a different image. A display that can show different images to two or more users provides a considerable saving in space and cost compared with use of two or more separate displays.

Examples of possible applications of multiple-view directional display devices have been given above, but there are many other applications. For example, they may be used in aeroplanes where each passenger is provided with their own individual in-flight entertainment programmes. Currently each passenger is provided with an individual display device, typically in the back of the seat in the row in front. Using a multiple view directional display could provide considerable savings in cost, space and weight since it would be possible for one display to serve two or more passengers while still allowing each passenger to select their own choice of film.

A further advantage of a multiple-view directional display is the ability to preclude the users from seeing each other's views. This is desirable in applications requiring security such as banking or sales transactions, for example using an automatic teller machine (ATM), as well as in the above example of computer games. A further application of a multiple view directional display is in producing a three-dimensional display. In normal vision, the two eyes of a human perceive views of the world from different perspectives, owing to their different location within the head. These two perspectives are then used by the brain to assess the distance to the various objects in a scene. In order to build a display which will effectively display a three dimensional image, it is necessary to re-create this situation and supply a so-called "stereoscopic pair" of images, one image to each eye of the observer.

Three dimensional displays are classified into two types depending on the method used to supply the different views to the eyes. A stereoscopic display typically displays both images of a stereoscopic image pair over a wide viewing area. Each of the views is encoded, for instance by colour, polarisation state, or time of display. The user is required to wear a filter system of glasses that separate the views and let each eye see only the view that is intended for it.

An autostereoscopic display displays a right-eye view and a left-eye view in different directions, so that each view is visible only from respective defined regions of space. The region of space in which an image is visible across the whole of the display active area is termed a "viewing window". If the observer is situated such that their left eye is in the viewing window for the left eye view of a stereoscopic pair and their right eye is in the viewing window for the right-eye image of the pair, then a correct view will be seen by each eye of the observer and a three-dimensional image will be perceived. An autostereoscopic display requires no viewing aids to be worn by the observer.

An autostereoscopic display is similar in principle to a dual-view display. However, the two images displayed on an autostereoscopic display are the left-eye and right-eye images of a stereoscopic image pair, and so are not independent from one another. Furthermore, the two images are displayed so as to be visible to a single observer, with one image being visible to each eye of the observer.

For a flat panel autostereoscopic display, the formation of the viewing windows is typically due to a combination of the picture element (or "pixel") structure of the image display unit of the autostereoscopic display and an optical element, generically termed a parallax optic. An example of a parallax optic is a parallax barrier, which is a screen with transmissive regions, often in the form of slits, separated by opaque regions. This screen can be set in front of or behind a spatial light modulator (SLM) having a two-dimensional array of picture elements to produce an autostereoscopic display.

FIG. 26 is a plan view of a conventional multiple view directional device, in this case an autostereoscopic display. The directional display 1 consists of a spatial light modulator (SLM) 4 that constitutes an image display device, and a parallax barrier 5. The SLM of FIG. 2 is in the form of a liquid crystal display (LCD) device having an active matrix thin film transistor (TFT) substrate 6, a counter-substrate 7, and a liquid crystal layer 8 disposed between the substrate and the counter substrate. The SLM is provided with addressing electrodes (not shown) which define a plurality of independently-addressable picture elements, and is also provided with alignment layers (not shown) for aligning the liquid crystal layer. Viewing angle enhancement films 9 and linear polarisers 10 are provided on the outer surface of each substrate 6, 7. Illumination 11 is supplied from a backlight (not shown).

The parallax barrier 5 comprises a substrate 12 with a parallax barrier aperture array 13 formed on its surface adjacent the SLM 4. The aperture array comprises transparent apertures 15 separated by opaque portions 14. The apertures 15 are vertically extending (that is, extending into the plane of the paper in FIG. 26), and have the form of slits. An anti-reflection (AR) coating 16 is formed on the opposite surface of the parallax barrier substrate 12 (which forms the output surface of the display 1).

The pixels of the SLM 4 are arranged in rows and columns with the columns extending into the plane of the paper in FIG. 26. The pixel pitch (the distance from the centre of one pixel to the centre of an adjacent pixel) in the row or horizontal direction is p. The width of the vertically-extending transmissive slits 15 of the aperture array 13 is 2w and the horizontal pitch of the transmissive slits 15 is b. The plane of the barrier aperture array 13 is spaced from the plane of the liquid crystal layer 8 by a distance s.

In use, the display device 1 forms a left-eye image and a right-eye image, and an observer who positions their head such that their left and right eyes are coincident with the left-eye viewing window 2 and the right-eye viewing window 3 respectively will see a three-dimensional image. The left and right viewing windows 2,3 are formed in a window plane 17 at the desired viewing distance from the display. The window plane is spaced from the plane of the aperture array 13 by a distance $r_o$. The windows 2,3 are contiguous in the window plane and have a pitch e corresponding to the average separation between the two eyes of a human. The half angle to the centre of each window 2, 3 from the normal axis to the display normal is $\alpha_s$.

The pitch of the slits 15 in the parallax barrier 5 is chosen to be close to an integer multiple of the pixel pitch of the SLM 4 so that groups of columns of pixels are associated with a specific slit of the parallax barrier. FIG. 26 shows a display device in which two pixel columns of the SLM 4 are associated with each transmissive slit 15 of the parallax barrier.

In operation, the pixels are driven to display two images that are the left image and right image of a stereoscopic image pair. The images are interlaced on the pixels with, in the display of FIG. 26, alternate columns of pixels being assigned to each image.

A dual view display is similar in principle to the autostereoscopic 3-D display of FIG. 26. However, the pixels are driven to display two independent images intended for display to different observers. Moreover, since the images are intended for display to different observers the pitch e of the two viewing windows is greater in a dual view display than in an autostereoscopic 3-D display—the pitch e is typically of the order of a meter in a dual view display, and of the order of ten cm in an autostereoscopic 3-D display.

A high quality dual view display requires that each user is able to see a high quality, bright image of the desired data content without any interference from the other user's data content. Additionally, each user will require some freedom to move their viewing position again without degradation in image quality and without any interference from the other user's data content. If a user can see interference from the other user's data content then this is typically termed crosstalk or image mixing.

Another type of known display is a display in which the angular output range of light is controllable, so that the display can be switched between a wide angle viewing mode and a narrow angle viewing mode. Electronic display devices such as, for example, monitors used with computers and screens built in to mobile telephones and other portable information devices, are usually designed to have as wide a viewing angle as possible, so that an image displayed by the device can be seen from many different viewing positions. However, there are some situations where it is desirable for an image displayed by a device to be visible from only a narrow range of viewing angles. For example, a person using a portable computer in a crowded train might want the display screen of the computer to have a small viewing angle so that a document displayed on the computer screen cannot be read by other passengers on the train. For this reason, there has been considerable effort put in to developing display devices which are electrically switchable between two modes of operation—in a 'public' display mode they have a wide viewing angle for general use, but they can be switched to a 'private' display mode in which they have a narrow viewing angle so that private information can be displayed in public places without being visible to people other than the user of the device.

Another application of such a display may be as a display in a motor vehicle. The viewing angle of the display could be controlled such that the passengers are unable to see the display or such that the driver is unable to see the display. Alternatively the viewing angle could be controlled in order to reduce the reflections of the display in the windscreen and the windows—so that, for example, the viewing angle could be reduced at night-time or in low light conditions. A brightness sensor could be provided to allow automatic switching between a wide viewing angle and a narrow viewing angle, and also to allow automatic control of the brightness of the display.

A number of devices are known which restrict the range of angles or positions from which a display can be viewed.

U.S. Pat. No. 6,552,850 describes a method for the display of private information on an automatic teller machine (ATM). Light emitted by the machine's display has a fixed polarisation state, and the machine and its user are surrounded by a large screen of sheet polariser which absorbs light of that polarisation state but transmits light of the orthogonal polarisation state. Passers-by can see the user and the machine, but cannot see information displayed on the machine's screen.

One known element for controlling the direction of light is a 'louvred' film that consists of alternating transparent layers and opaque layers provided in an arrangement similar to a Venetian blind. The film operates on the same principle as a Venetian blind, and it allows light to pass through it when the light is travelling in a direction parallel to, or nearly parallel to, the opaque layers. However, light travelling at large angles to the plane of the opaque layers is incident on one of the opaque layers and is absorbed. The layers may be perpendicular to the surface of the film, or they may be at some other angle to the surface of the film.

Louvred films of this type may be manufactured by stacking many alternating sheets of transparent material and opaque material and then cutting slices of the resulting block perpendicular to the layers. This method has been known for many years and is described in, for example, U.S. Pat. Nos. 2,053,173, 2,689,387 and 3,031,351.

Other manufacturing methods are known. For example, U.S. Pat. No. RE27617 describes a process where a louvred film is cut continuously from a cylindrical billet of stacked layers. U.S. Pat. No. 4,766,023 describes how the optical quality and mechanical robustness of the resulting film can be improved by coating with a UV-curable monomer and then exposing the film to UV radiation. U.S. Pat. No. 4,764,410 describes a similar process where a UV-curable material is used to bond the louvre sheet to a covering film.

Other methods exist for making films with similar properties to the louvred film. For example, U.S. Pat. No. 5,147,716 describes a light-control film which contains many elongated particles which are aligned in the direction perpendicular to the plane of the film. Light rays which make large angles to this direction are therefore strongly absorbed, whereas light rays propagating in this direction are transmitted.

Another example of a light-control film is described in U.S. Pat. No. 5,528,319. This film has a transparent body in which are embedded opaque regions that extend generally parallel to the plane of the film. The opaque regions are arranged in stacks, with each stack being spaced from a neighbouring stack. The opaque regions block the transmission of light through the film in certain directions while allowing the transmission of light in other directions.

The prior art light control films may be placed either in front of a display panel or between a transmissive display panel and its backlight, to restrict the range of angles from which the display can be viewed. In other words, the prior art light control films make a display 'private'. However none of the prior art light control films enables the privacy function to be switched off to allow viewing from a wide range of angles.

There have been reports of a display which can be switched between a public mode (with a wide viewing angle) and a private mode (with a narrow viewing angle). For example, U.S. patent application No. 2002/0158967 suggests that a light control film could be movably mounted on a display so that the light control film either may be positioned over the front of the display to give a private mode or may be mechanically retracted into a holder behind or beside the display to give a public mode. This method has the disadvantage that it contains moving parts which may fail or be damaged in use, and which add bulk to the display.

A method for switching a display panel from public to private mode with no moving parts is to mount a light control film behind the display panel, and to place a diffuser which can be electronically switched on and off between the light control film and the panel. When the diffuser is inactive, the light control film restricts the range of viewing angles and the display is in a private mode. When the diffuser is switched on, the light with a narrow angle range output from the light control film is incident on the diffuser, and the diffuser acts to increase the angular spread of the light—that is, the diffuser cancels out the effect of the light control film. Thus, the display is illuminated by light travelling at a wide range of angles and the display operates in a public mode. It is also possible to mount the light control film in front of the panel and place the switchable diffuser in front of the light control film to achieve the same effect.

Switchable privacy devices of the above type are described in U.S. Pat. Nos. 5,831,698, 6,211,930 and 5,877,829. They have the disadvantage that the light control film always absorbs a significant fraction of the light incident upon it, whether the display is in public mode or private mode. The display is therefore inherently inefficient in its use of light. Furthermore, since the diffuser spreads light through a wide range of angles in the public mode, these displays are also dimmer in public mode than in private mode (unless the backlight is made brighter when the device is operating in public mode to compensate).

Another disadvantage of these devices relates to their power consumption. Such devices often use a switchable polymer-dispersed liquid crystal diffuser which is not diffusive when no voltage is applied across the liquid crystal layer and which is switched on (into the diffusive state) by applying a voltage. Thus, to obtain the public mode of operation it is necessary to apply a voltage across the diffuser so that the diffuser is switched on. More electrical power is therefore consumed in the public mode than in the private mode. This is a disadvantage for mobile devices which are used for most of the time in the public mode and which have limited battery power.

Another method for making a switchable public/private display is given in U.S. Pat. No. 5,825,436. The light control device in this patent is similar in structure to the louvred film described above. However, each opaque element in a conventional louvred film is replaced by a liquid crystal cell which can be electronically switched from an opaque state to a transparent state. The light control device is placed in front of or behind a display panel. When the cells are opaque, the display operates in a private mode; when the cells are transparent, the display operates in a public mode.

One significant disadvantage of this device is the difficulty and expense of manufacturing liquid crystal cells with an appropriate shape. A second disadvantage is that, in the private mode, a ray of light may enter at an angle such that it passes first through the transparent material and then through part of a liquid crystal cell. Such a ray will not be completely absorbed by the liquid crystal cell and this may reduce the privacy of the device.

Japanese patent application JP3607272 describes another display that is switchable between public and private display modes. This device uses an additional liquid crystal panel, which has a patterned liquid crystal alignment. Segments of the panel having different liquid crystal alignments modify the viewing characteristics of different areas of the display in different ways, with the result that the whole display panel is fully readable only from a central viewing position.

UK patent application No. 0320353.5 describes switchable privacy devices based on louvres, which operate only for one polarisation of light. The louvres are switched on and off either by rotating dyed liquid crystal molecules in the louvre itself, or by rotating the plane of polarisation of the incident light using a separate element.

UK patent application No. 0408742.5 describes a switchable privacy device constructed by adding one or more additional liquid crystal layers and polarisers to a display panel. The intrinsic viewing angle dependence of these extra elements can be changed by switching the liquid crystal electrically in the well-known way.

UK patent application No. 0401062.5 describes a display having two different backlights which generate light with different angular ranges. The display can be switched between a public display mode and a private display mode by using the appropriate backlight.

UK patent application No. 0427303.3 discloses a display in which a polarisation modifying layer (PML) is placed behind the exit polariser of a liquid crystal display panel. Some parts of the PML are transparent. Other parts of the PML change the polarisation of light passing through them so that pixels viewed through these parts are inverted in colour (with bright pixels becoming dark and dark pixels becoming bright). Data sent to pixels directly behind these parts is inverted so that when the display is viewed from a central position, the image appears normally. However, when the display is viewed from a non-central position, pixels that are supplied with non-inverted image data are viewed through the retarder elements of the PML, and the image is corrupted. Off-axis viewers see a confusing image which is a random dot pattern. The PML may be made from liquid crystal and switched off to give a public mode.

WO 95/11127 discloses a shutter intended for, for example, the roof of a conservatory. The shutter has a layer of thermochromic material disposed adjacent to a transparent electrically conductive layer. When a current flows in the electrically conductive layer, the thermochromic material is heated and becomes opaque.

EP 0 395 113 relates to a ferroelectric liquid crystal light valve intended to record an image. The liquid crystal layer is electrically switched between two stable states, by applying a suitable voltage across the liquid crystal layer. A laser beam absorbing layer is provided next to the liquid crystal layer and, when a part of this layer is irradiated, it heats up and changes the characteristics of the liquid crystal layer adjacent to the eradiated part of the laser beam absorbing layer.

U.S. Pat. No. 4,283,113 discloses use of a vanadium oxide thin film for switching infrared radiation, for example between optical fibres. The vanadium oxide thin film is thermally switched between a metallic state in which it is absorbing for infrared radiation and a semiconducting state in which it is transmissive for infrared radiation having a wavelength of greater than approximately 1 mm.

U.S. Pat. No. 5,608,568 similarly discloses a spatial light modulator for modulating infrared radiation that uses a vanadium dioxide thin film.

SUMMARY OF THE INVENTION

A first aspect of the present invention provides an optical element comprising: a material thermally switchable between a first stable state and a second stable state different from the first stable state; and a switching mechanism for switching at least a selected area of the material between the first stable state and the second stable state thereby to change the transmissivity of one or more selected areas of the optical element, wherein the material is bistable or multistable, and the first and second stable states are its two bistable states (in the case of a bistable material) or are two of its stable states (in the case of a multistable material). Use of a bistable or multistable material means that a heat pulse is required to be applied only when it is desired to switch the material, thereby reducing power consumption.

By the term "optical element" is meant an element that may be placed in an optical path through another component, such as for example a display, reflector or backlight, such that the optical element may be controlled to change the optical properties of the component. The properties that may be changed include, but are not limited to, the display mode of a display, viewing angle range, brightness/luminance, and colour. By the term "optical properties" is meant properties relating to the visible region of the spectrum, extending from a wavelength of approximately 400 um to a wavelength of approximately 700 um.

As an example, an optical element of the invention may be used in conjunction with a display to change the mode of the display. For example, if the element is substantially non-transmissive for one state of the thermally switchable material, the thermally switchable material may be arranged to provide a parallax optics, for example such as a parallax barrier, in one state. Thus a display may be switched between a directional display mode, for example a 3D-mode or multi-view display mode, and a conventional 2-D display mode by putting the thermally switchable material into its appropriate state—when the thermally switchable material is put into the non-transmissive state the parallax optics is enabled, and when the thermally switchable is put into another state the parallax optics is disabled.

In another example, the thermally switchable material may be used to define a parallax barrier that may be selectively enabled and the optical element may be provided with a lens array. If the slits of the barrier array are located in the focal plane of the lens array, any light that passes through a slit, now defined as the focal point of a respective lens of the lens array, will be collimated. Such an element can be used with a display to enable the display to be switched between a wide viewing angle mode and a narrow viewing angle mode by changing the state of the thermally switchable material.

As a further application of the invention, the thermally switchable material may alternatively be switchable between two states which provide different non-zero values of light transmissivity for the element. When such an element is used with a display the brightness of the display can be made dimmer by switching the state of the thermally switchable material. An example of an application of this would be in a motor car, when the GPS display is bright during the day to overcome the ambient light or because the weather is cloudy. The driver would prefer to reduce the brightness of the display the night time as his vision is affected by any parasitic lighting coming from the dashboard and more generally from inside the car. In this embodiment, the optical element may be arranged such that the transmissivity of the optical element is changed over the entire active area of the optical element.

Another example, still concerning a motor vehicle, would be to cover the wing mirrors and/or the rear view mirror by an optical element of the invention, to allow the driver the dim the brightness of the reflected image, for example when bright headlights of a car behind are reflected in the mirror. This would reduce the inconvenience of such a case and also reduce the chance of an accident as a result of the driver being dazzled.

As a further example, the thermally switchable material may alternatively be switchable between a state which provides a high light transmissivity for the element and a state in which the element appears coloured. In this example, the optical element may be placed over the display of, for example, a mobile telephone to enable the display to adopt the same colour as the body of the telephone when the telephone is switched off.

The material may have a first transmissivity in the first state and may have a second transmissivity different from the first transmissivity in the second state.

The one or more selected areas of the optical element may constitute less than the entire active area of the optical element. Alternatively, the optical element may be arranged such that the thermally switchable material is, in use, switched over the entire active area of the optical element.

The one or more selected areas of the optical element may constitute a plurality of stripe-shaped areas that extend generally parallel to one another. This allows a parallax barrier to be selectively defined in the optical element.

The optical element may further comprise a lens array.

The material may be disposed substantially in a focal plane of the lens array.

Each lens of the lens array may be laterally spaced from a respective selected area of the material. For example, in an optical element in which the material is arranged as a plurality of stripe-shaped areas that extend generally parallel to one another, each lens may be placed in a gap between two adjacent stripe-shaped areas of the material.

The switching mechanism for switching at least the selected area of the material may comprise a heating mechanism for selectively heating the or each selected area of the material.

The heating mechanism may be in a fixed relationship to the material.

The heating mechanism may be provided in an optical path through the optical element.

The heating mechanism may be transparent or semi-transparent.

The heating mechanism may comprise a plurality of heating elements. For example, the heating mechanism may comprise a plurality of resistive heating elements that generate heat when an electric current is passed through them. Each heating element may be substantially co-extensive with a respective selected area of the material. Alternatively, an optical element may comprise a single heating element.

The mechanism for switching the or each selected area of the material may alternatively comprise a mechanism for irradiating the or each selected area of the material.

The material may be patterned thereby to define a plurality of selected areas of the material. Each selected area of material corresponds to a region of the optical element whose transmissivity it is desired to control.

The optical element may be, for one of the first stable state and the second stable state of the material, transmissive. By "transmissive" is meant maximally transmissive, i.e. that the transmissivity has its greatest possible value.

Switching a selected area of the material from the first stable state to the second stable state may reduce the transmissivity of a corresponding area of the optical element. It may reduce the transmissivity of a corresponding area of the optical element to substantially zero.

The switching mechanism may switch, in use, substantially the entire active area of the material.

A second aspect of the invention provides a display comprising: an image display panel; and an optical element of the first aspect arranged in an optical path through the image display panel.

A third aspect of the invention provides a reflector comprising: a light-reflective surface; and an optical element of the first aspect arranged in an optical path to or from the light-reflective surface.

A fourth aspect of the invention provides a backlight comprising an optical element of the first aspect.

The backlight may comprise a waveguide having a surface for emitting, in use, light, and the optical element may be arranged in an optical path of light from the waveguide.

A fifth aspect of the invention provides a display comprising: an image display panel; a material thermally switchable between a first state and a second state different from the first state disposed over at least part of the image display panel; and a switching mechanism for switching one or more selected areas of the material between the first state and the second state thereby to change the transmissivity in the visible spectrum of one or more selected areas of the material.

The material may be bistable and may have the first state and the second state as its two stable states.

The material may have a first transmissivity in the first state and may have a second transmissivity different from the first transmissivity in the second state.

The one or more selected areas of the material may correspond to less than the entire display area of the display.

The one or more selected areas of the material may constitute a plurality of stripe-shaped areas that extend generally parallel to one another.

The display may further comprise a lens array.

The material may be disposed substantially in a focal plane of the lens array.

Each lens of the lens array may be laterally separated from a respective selected area of the material.

The switching mechanism for switching the or each selected area of the material may comprise a heating mechanism for heating the or each selected area of the material.

The heating mechanism may be transparent or semi-transparent.

The heating mechanism may comprise a plurality of heating elements.

The heating mechanism may be in a fixed relationship to the material.

The heating mechanism may be provided in an optical path through the display.

Each heating element may be substantially co-extensive with a respective selected area of the material.

The display may further comprise a thermally insulating material disposed between the heating mechanism and the image display panel.

The mechanism for switching the or each selected area of the material may comprise a mechanism for irradiating the or each selected area of the material.

The material may be patterned thereby to define the or each selected area of the material.

The material may be, for the first state of the material, maximally light-transmissive.

Switching a selected area of the material from the first state to the second state may reduce the transmissivity of a corresponding area of the material. It may reduce the transmissivity of a corresponding area of the material to substantially zero.

The switching mechanism may switch, in use, substantially the entire active area of the material.

The display may comprising a drive circuit for driving the switching mechanism in accordance with the temperature of the display.

An optical element of the first aspect may comprise a drive circuit for driving the switching mechanism in accordance with the temperature of the optical element.

A sixth aspect of the invention provides a reflector comprising: a light-reflective surface; a material thermally switchable between a first state and a second state different from the first state disposed over at least part of the light-reflective surface; and a switching mechanism for switching at least a selected area of the material between the first state and the second state thereby to change the reflectivity in the visible spectrum of one or more selected areas of the reflector.

A seventh aspect of the invention provides a backlight comprising: a surface for emitting, in use, light; a material thermally switchable between a first state and a second state different from the first state disposed over at least part of the light-emitting surface of the waveguide; and a switching mechanism for switching at least a selected area of the material between the first state and the second state thereby to change the brightness in the visible spectrum of one or more selected areas of the backlight.

BRIEF DESCRIPTION OF THE DRAWINGS

Preferred embodiments of the present invention will be described by way of illustrative example with reference to the accompanying figures, in which:

FIGS. 1 to 4(a) are schematic cross-sectional views of displays according to the present invention;

FIG. 4(b) is a schematic cross-sectional view of a backlight according to the present invention;

DESCRIPTION OF THE EMBODIMENTS

Figure 1:
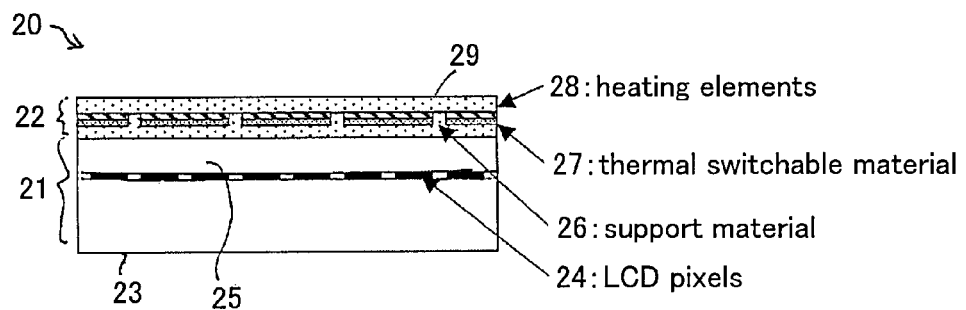

FIG. 1 is a cross-sectional view through a display 20 according to one embodiment of the present invention. The display comprises an image display panel 21 and an optical element 22 arranged in an optical path through the display panel 21. The image display panel 21 may be any suitable or conventional image display panel, and is represented in FIG. 1 as an image display layer 24, for example a pixelated liquid crystal layer, disposed between first and second transparent substrates 23, 25. The nature of the image display panel 21 is however not material to the present invention, and the image display panel will not be described further.

The optical element 22 contains a material 27 that is thermally switchable between at least a first stable state and a second, different stable state. The element also contains switching means for switching the material from one stable state to another, and in the embodiment of FIG. 1 the switching means are arranged to, in use, heat the thermally switchable material so as to switch it from one stable state to another. In the embodiment of FIG. 1, the switching means comprise heating means which are constituted by a plurality of heating elements 28. The heating elements are in a fixed relationship to the thermally switchable material 27 and can switch the thermally switchable material 27 from one stable state to another by applying a pulse of heat to the thermally switchable material 27. The nature of the thermally switchable material is described in more detail below.

The heating elements 28 may be transparent or semi-transparent heating elements, and may be made of, for example, indium tin oxide (ITO).

The thermally switchable material 27 and the heating elements 28 are supported by a suitable transparent support material 26, for example an adhesive material, and are overlaid by a further layer 29 of transparent material which may again be a suitable transparent adhesive.

Figure 26:
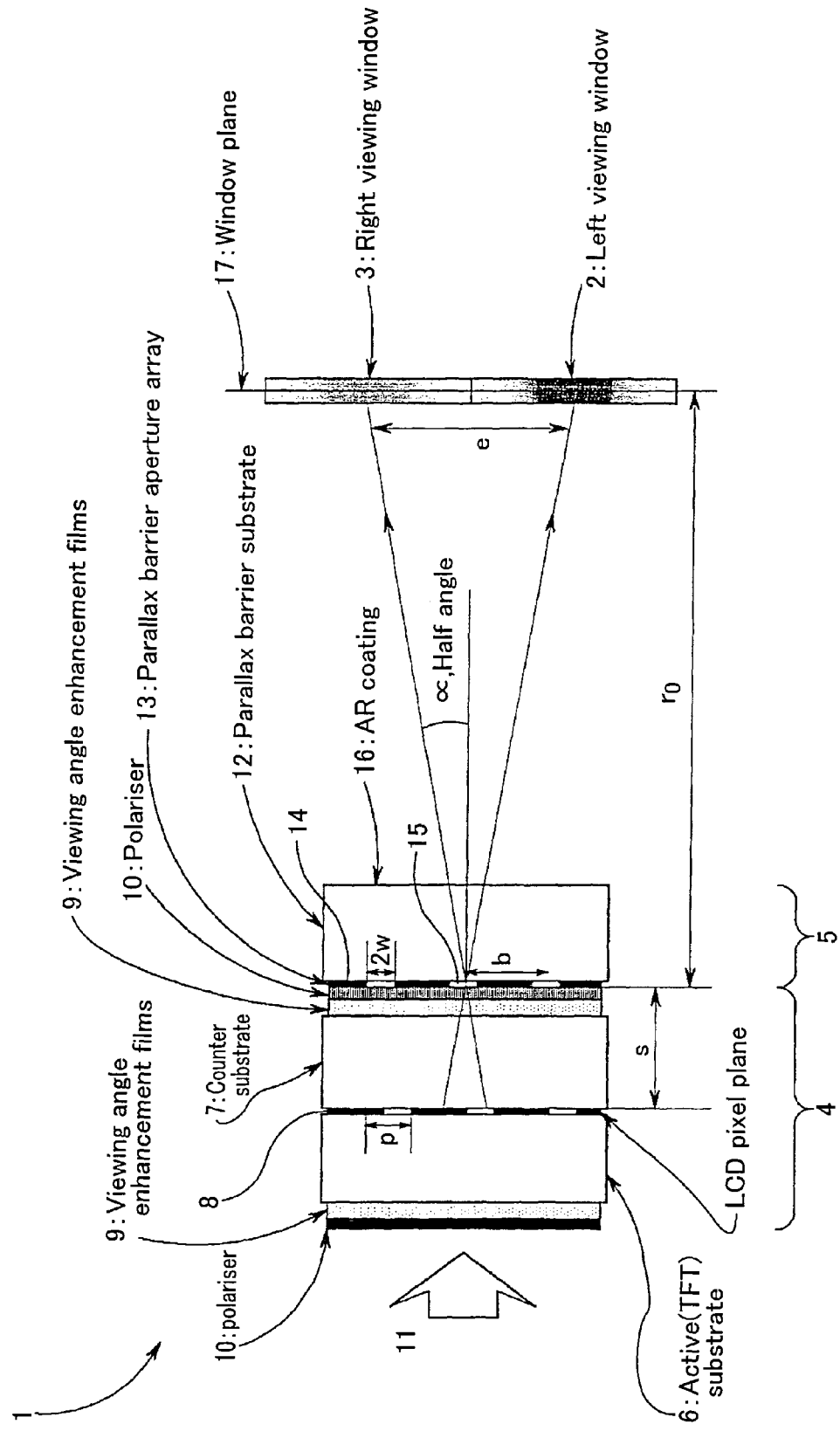
FIG. 26 is a schematic cross-sectional view of a multiple view directional display.

In the embodiment of FIG. 1 the thermally switchable material 27 is arranged a series of parallel strips, that extend into the plane of paper in FIG. 1. The thermally switchable material 27 is arranged such that, when the thermally switchable material is in one of its stable states, the corresponding part of the optical element 22 has a substantially non-zero transmissivity. Thus, when the strips of thermally switchable material are put into the stable state which makes the corresponding parts of the optical element substantially non-transmissive (this will be referred to as the "opaque state" of the thermally switchable material, for convenience), a parallax barrier aperture array is defined in the optical element 22. The display 20 may operate in a directional display mode, by displaying first and second images on alternate columns of pixels, as described with reference to FIG. 26.

When the thermally switchable material is in its other stable state, or in another of its stable states, the corresponding regions of the optical element 22 are substantially non-light absorbing (this state will be referred to as the "transmissive state" of the thermally switchable material, for convenience). When the thermally switchable material is put into its transmissive state the optical element has a substantially uniform transmissivity over its entire area and no parallax barrier is defined. The display 20 thus operates as a conventional 2-D display. Thus, the display 20 of FIG. 1 may be switched between a 2-D display mode and a multiple view, directional display mode simply by causing the heating elements 28 to heat the thermally switchable material 27 so as to switch it from its transparent state to its opaque state (and by suitably re-addressing the pixels of the image display layer 24).

In preferred embodiments, as is described in more detail below, the thermally switchable material 27 is switched from its transparent state to its opaque state by the heating elements 28 applying a pulse of heat to the thermally switchable material, and is also switched from its opaque state to its transparent state by the heating elements 28 applying a pulse of heat to the thermally switchable material. Once the thermally switchable material has been switched, the heating elements 28 do not need to supply heat until it is next desired to switch the thermally switchable material.

Figure 2:
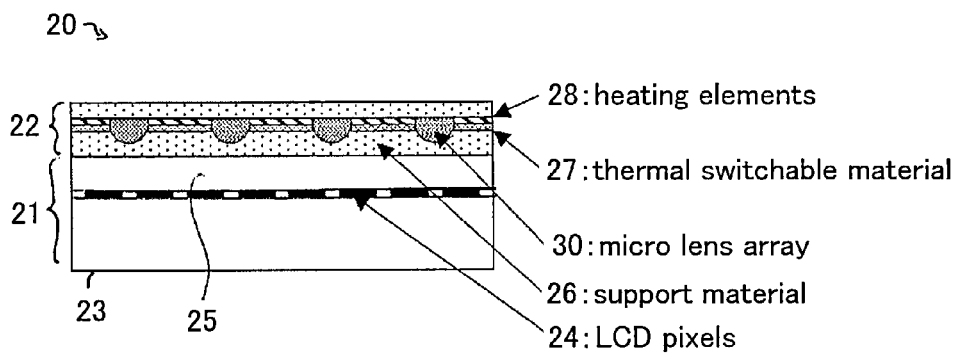

FIG. 2 shows a display 20 according to a further embodiment of the present invention. The display 20 of FIG. 2 is generally similar to the display 20 of FIG. 1, and only the differences will be described here.

The display 20 of FIG. 2 further comprises an array 30 of microlenses. Each microlens is laterally spaced from a respective strip of thermally switchable material 27, such that it is disposed between two adjacent strips of thermally switchable material 27. The lenses of the microlens array extend into the plane of the paper, and their extent in the direction into the plane of the paper is generally equal to the extent of the strips of thermally switchable material in the direction into the plane of the paper.

The micro lens array allows the slit width of the parallax barrier to be made greater, and so the light absorption in the barrier when it is enabled is decreased. The brightness of the display in its multi-view directional display mode is therefore increased. Provision of the micro lens array also improves the transition between the viewing windows formed in the multi-view directional display mode, which becomes sharper compared with a conventional parallax barrier.

Figure 3:
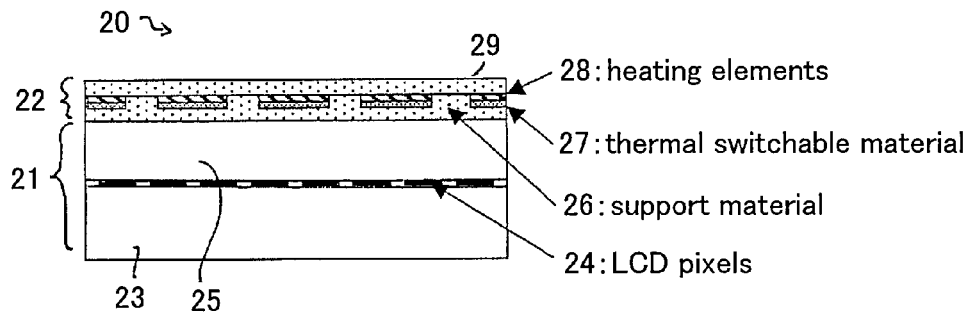

FIG. 3 shows a display 20 according to a further embodiment of the present invention. The display corresponds generally to the display of FIG. 1, and only the differences will be described here.

The parallax barrier shown in the display of FIG. 1 is intended to provide a dual view display mode when the thermally switchable material is in its opaque state and a parallax barrier is defined in the optical element 22. As explained above, in a dual view display mode, separate images are displayed to two different observers In FIG. 3, however, the thermally switchable material 27 is arranged so as to define, in its opaque state, a parallax barrier suitable for a 3-D autostereoscopic display, in which a left eye image and a right eye image are displayed to left eye and right eye of an observer. The principle of a 3-D autostereoscopic display is similar to the general principle of a dual view display, but the parallax barrier of a 3-D autostereoscopic display must be configured to provide viewing windows which are coincident with the left and right eyes of an observer.

The criteria for a parallax barrier, such as barrier pitch, width of opaque regions etc are well-known to a skilled person, and will not be described here.

FIG. 4(a) shows a display 20 according to a further embodiment of the present invention. The display corresponds generally to the display of FIG. 1, and only the differences will be described here.

The optical element 22 of the display of FIG. 4(a) comprises an array 30 of microlenses, with each lens of the microlens array extending into the plane of the paper and having an extent into the plane of the paper comparable to the extent of the strips of thermally switchable material 28. The microlenses are positioned such that the gaps between the strips of thermally switchable material 28 are in the focal plane of the respective micro lens, with the focal point of the microlens being approximately in the lateral centre of the gap.

When the thermally switchable material 28 is switched to its opaque state so as to define a parallax barrier, all light passing through the image display panel 21 must pass through one of the transparent regions of the parallax barrier—that is, through one of the slits formed between two adjacent strips of thermally switchable material. This light is collimated by the microlens array 30, so that all light passing through the display will be directed in substantially a single direction (in FIG. 4(a) light passing through the display will be directed substantially along then axis of the display, but the invention is not limited to this). In use, it is assumed that the display 20 will be illuminated by a suitable backlight (not shown) arranged on the opposite side of the image display panel to the optical element 22. Thus, the parallax barrier defined by the thermally switchable material and the microlens array act as a privacy device, for providing the display with a private display mode in which an image displayed on the image display panel 21 is visible only in a narrow range of viewing directions.

When the thermally switchable material is in its transparent state, and no parallax barrier is defined in the optical element 22, the effect of the microlens array 30 is not significant. An image displayed on the image display panel 21 will be visible from a wide range of viewing directions, and the display will operate in a wide viewing mode. The display 20 of FIG. 4(a) may therefore be switched between a narrow display mode and a wide display mode simply by causing the heating elements 28 to heat the thermally switchable material 27 to put it in its transparent state to provide a wide viewing mode or into its opaque state to provide a narrow display mode. In both modes, the image display layer 24 is addressed to display a single image.

FIG. 4(b) is a schematic cross-sectional illustration of a backlight 31 according to another embodiment of the present invention. The backlight 31 consists of a backlight unit 34 and an optical element 22 of the type shown in FIG. 4(a) arranged in a path of light from the backlight unit 34. As is explained with reference to FIG. 4(a), by switching the thermally switchable material 27 of the optical element 22 to its transparent state, light from the backlight unit 34 is directed over a wide range of angles, whereas if the thermally switchable material is switched to its opaque state light from the backlight unit 34 is collimated by the microlens array and is directed in only a narrow range of direction. The backlight 31 of FIG. 4(b) is therefore switchable between a wide backlight mode and a collimated backlight mode.

In FIG. 4(b) the backlight unit is shown as comprising a waveguide 33 that is illuminated by a light source 32 which may be, for example, a fluorescent tube that extends along one end face of the waveguide 33. As is known, light from the light source 32 is directed into the waveguide 33, and is emitted from the front face 33a of the waveguide. However, a backlight of the present invention is not limited to the specific backlight unit 34 shown in FIG. 4(b).

Figure 5:
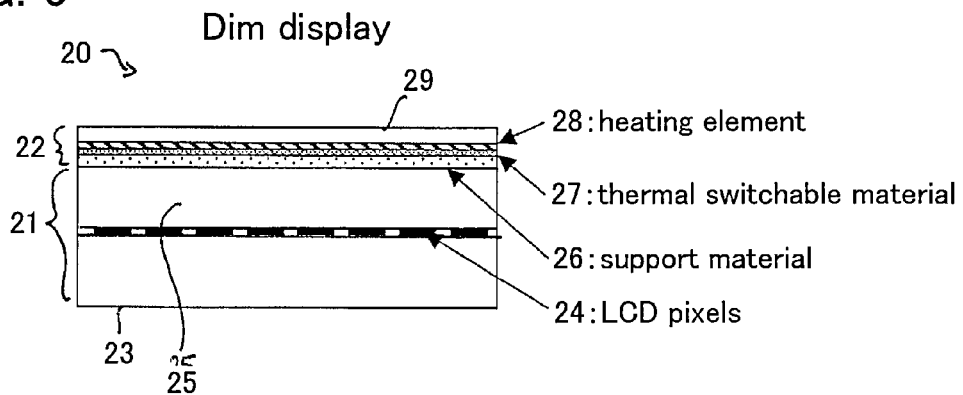
FIGS. 5 and 6 are schematic cross-sectional views of further displays according to the present invention.

FIG. 5 shows a display 20 according to a further embodiment of the present invention. The display is generally similar to the display of FIG. 1, and only the differences will be described.

In the display of FIG. 5, the thermally switchable material 27 is not patterned, but extends over substantially the entire area of the optical element 22—which in turn is substantially co-extensive with the output face of the image display panel 21. The switching means comprises a single heating element 28, which extends generally over the entire active area of the optical element. In this embodiment, the thermally switchable material 27 is switchable between two states which provide the optical element 22 with two different, but both non-zero, transmissivities. For example, one state of the thermally switchable material may provide the optical element with substantially 100% transmissivity, and the other state may provide the optical element with a reduced, but still non-zero, transmissivity. The display 20 can therefore be operated in either a bright mode or a dim mode, by switching the thermally switchable material appropriately. Such a display can be used in applications where the display must provide a visible image in a wide range of ambient light conditions—a display could be operated in its bright mode in sunlight, for example, to ensure that a displayed image is visible, and could be switched to its dim display mode at night to avoid providing too bright an image.

Figure 6:
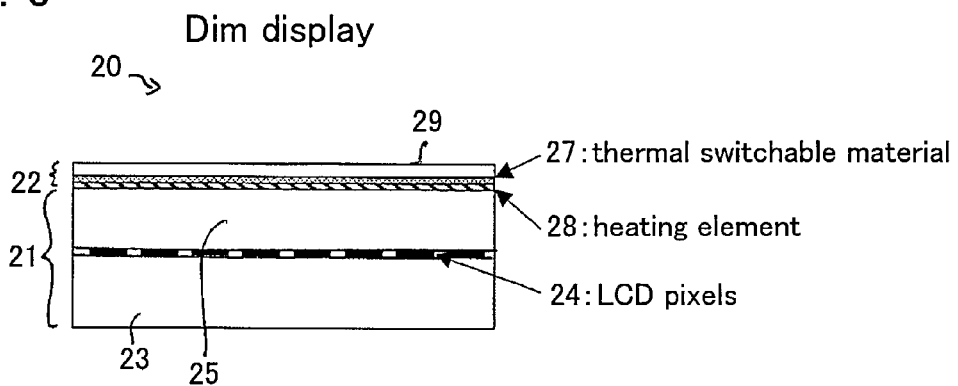

FIG. 6 shows a display 20 according to a further embodiment of the present invention. This display corresponds generally to the display of FIG. 5, and only the differences will be described here.

In the display of FIG. 6, the heating element 28 is disposed directly on the upper substrate 25 of the image display panel 21, and the layer of support material 26 of FIG. 1 is omitted. The thermally switchable material 27 is disposed directly over the heating element 28.

Figure 7:
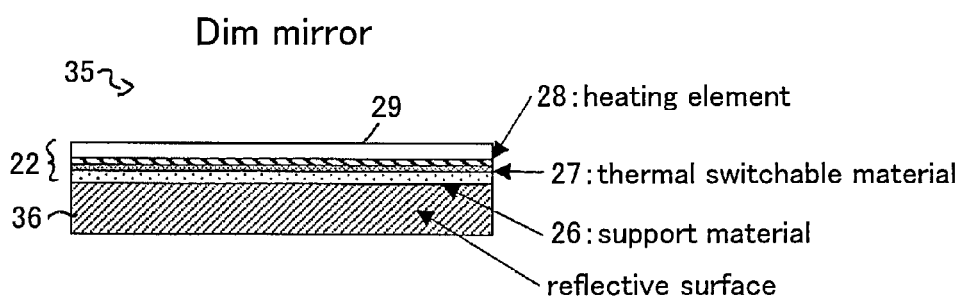
FIGS. 7 and 8 are schematic cross-sectional views of reflectors according to the present invention.

FIG. 7 shows a reflector according to a further embodiment of the present invention. The reflector 35 comprises a reflective surface 36, over which is disposed an optical element 22 of the invention. The optical element 22 of FIG. 7 corresponds to the optical element 22 of FIG. 5, and its description will not be repeated here. The reflector 35 of FIG. 7 may operate in either a bright mode or a dim mode, by switching the thermally switchable material 27 accordingly. A reflector of this embodiment may be used as, for example, a wing mirror or rear view mirror of a motor vehicle to allow the driver to dim the reflected image if for example, they are being dazzled by bright head lights of a vehicle behind.

Figure 8:
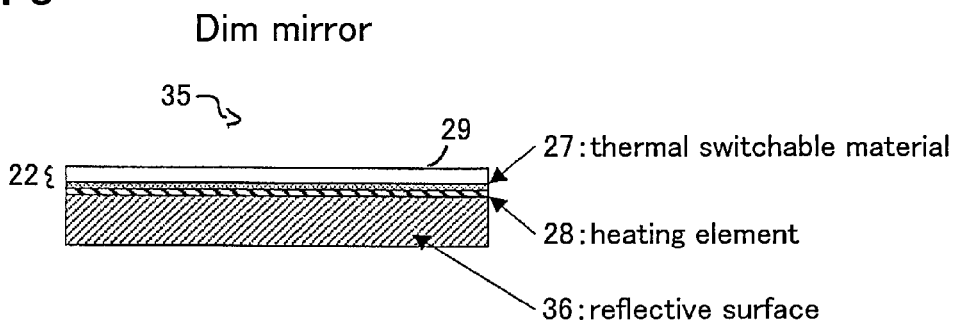

FIG. 8 shows a further reflector 35 of the present invention. The reflector 35 corresponds generally to the reflector 35 of FIG. 7, and only the differences will be described here.

In the reflector 35 of FIG. 8, the layer of support material 26 of FIG. 7 is omitted, and the heating element 28 is disposed directly over the reflective surface 36. The thermally switchable material 27 is disposed directly over the heating element 28.

In the embodiments of FIGS. 6 and 8, it would alternatively be possible to deposit the thermally switchable material 27 directly over the image display panel or reflector, and deposit the heating element over the thermally switchable material 27.

In the embodiments of FIGS. 1-8, the optical element 22 is incorporated into a display, a backlight or a reflector. The optical element 22 could alternatively be a free-standing component, that can be applied to, for example, a pre-existing display, backlight or reflector.

Figure 9:
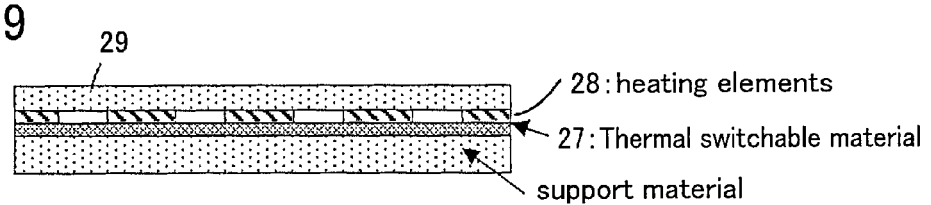
FIGS. 9 to 20 are schematic cross-sectional views of optical elements according to the present invention.

FIG. 9 is a schematic cross-sectional view through an optical element 22 of the present invention which comprises a plurality of heating elements 28, showing one possible arrangement of the thermally switchable material 27 and the heating elements 28. In this embodiment, the thermally switchable material 27 is arranged as a uniform layer covering the entire operating area of the optical element. The heating elements 28 are arranged so as to correspond with the areas of the thermally switchable material that it is desired to switch so that each heating element is substantially co-extensive with a respective area of the thermally switchable material that it is desired to switch. In an embodiment in which it is desired to define a parallax barrier, for example, the heating elements 28 could be arranged as a series of strip-like heating elements that extend into the plane of the paper in FIG. 9, with each strip-like heating element extending generally parallel to an adjacent strip-like heating element. The strip-like heating elements have a substantially uniform thickness, the width of the strip-like heating elements corresponds generally to the desired width of the opaque barriers of the parallax barrier aperture array, and the pitch of the strip-like heating elements corresponds to the desired pitch of the parallax barrier aperture array.

In the embodiment of FIG. 9, it is assumed that heat from each heating element 28 propagates substantially in the direction perpendicular to the surface of the thermally switchable material 27, so that the accuracy in defining the regions of the thermally switchable material that are switched comes from the accuracy with which the heating elements 28 are defined.

Figure 10:
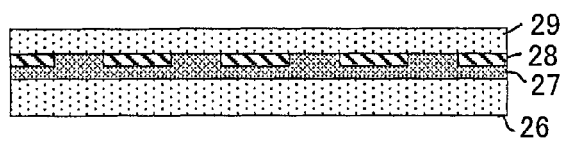

FIG. 10 shows an optical element 22 according to a further embodiment of the present invention. This corresponds generally to the optical element of FIG. 9, except that the spaces 37 between the heating element 28 in the embodiment of FIG. 9 are not present in the embodiment of FIG. 10; instead, further thermally switchable material 27 is provided between the heating elements 28 in the embodiment of FIG. 10.

Figure 11:
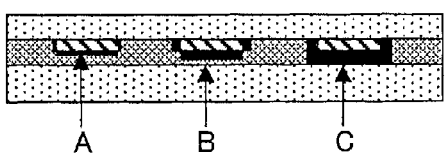

In the embodiments of FIGS. 9 and 10, varying the current applied to a heating element 28 and/or the time period for which the current is applied will vary the thermal pulse applied by the heating element to the surrounding thermally switchable material 27. The greater is the thermal pulse applied by heating element 28, the more effective the pulse will be to switch the surrounding thermally switchable material 27. This is illustrated in FIG. 11, which shows the effect of increasing the thermal pulse applied by a heating element 28, by increasing the current applied to a heating element and/or the period of time for which the current is applied to a heating element. In FIG. 11, "A" illustrates the effect of applying a small thermal pulse to the thermally switchable material, "B" illustrates the effect of applying a larger thermal pulse to the thermally switchable material, and "C" illustrates the effect of applying a yet larger thermal pulse to the thermally switchable material. The black regions in FIG. 11 denote the thermally switchable material that is switched by the respective heating pulse. It can be seen that the characteristics of the switched regions of material, such as the width of the region that is switched, or the depth to which the region that is switched (and hence the resultant change in transmissivity of the corresponding region of the optical element) depend on the thermal pulse. Where the invention is applied to provide, for example, a parallax barrier, it is therefore possible to vary characteristics of the parallax barrier defined in the optical element—such as the width of the opaque barrier regions, or the transmissivity of the opaque barrier regions— by varying the heating pulse applied by the heating elements (for example by varying, the magnitude of the current pulse applied to the heating elements or the duration of the pulse applied to the heating element).

In the embodiments of FIGS. 9-11 the thermally switchable material 27 has been applied as a uniform layer over substantially the entire area of the optical element, and discrete heating elements 28 have been provided so that, in use, only certain parts of the thermally switchable material are heated whilst other areas of the thermally switchable material are substantially not heated. For example, a uniform layer of resistive material may be deposited, and may then be patterned using any suitable technique to define a plurality of heating elements. In other embodiments of the invention, however, the thermally switchable material 27 is patterned and examples of these embodiments are shown in FIGS. 12-15.

Figure 12:
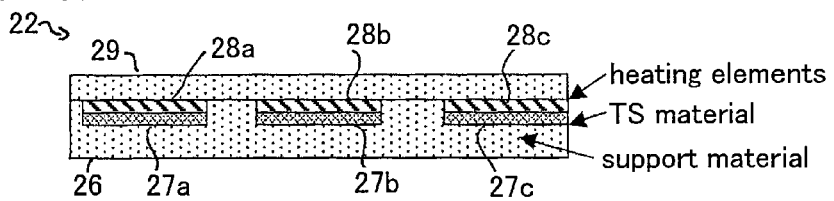

FIG. 12 is a schematic sectional view of another optical element 22 of the present invention. The optical element again comprises a thermally switchable material 27 disposed over a support material 26. The thermally switchable material is provided as a number of discrete regions 27a, 27b, 27c of thermally switchable material. In an example in which the optical element 20 is intended to produce a parallax barrier aperture array, the regions 27a, 27b, 27c of thermally switchable material will have the form of strips that extend into the plane of the paper, parallel to one another. For example, a uniform layer of thermally switchable material may be deposited, and may then be patterned using any suitable technique to define a plurality of discrete regions 27a, 27b, 27c of thermally switchable material. This embodiment may be effected using, for example, a mixture of thermally switchable material and a photoresist, so that the resulting mixture can be patterned using conventional masking and photolithographic techniques.

In the embodiment of FIG. 12 heating elements 28a, 28b, 28c are disposed over the regions 27a-27c of thermally switchable material. In this embodiment, each heating element 28a-28c is substantially co-extensive with a respective one of the regions of thermally switchable material 27a-27c.

A further layer 29 of support material is disposed over the heating element 28a-28c. The spaces between the adjacent regions of thermally switchable material and heating elements are also filled with a suitable support material.

The embodiment of FIG. 12 is suitable where the support material 26 is thermally conductive, so that heat from a heating element will propagate in every direction. By patterning the thermally switchable material it is possible to ensure that the transmissivity of the optical element 20 changes only in those regions in which it is desired to change. The transmissivity of the optical element cannot change in regions where no thermally switchable material is provided, even if heat from the heating element is dissipated into those regions of the optical element.

Figure 13:
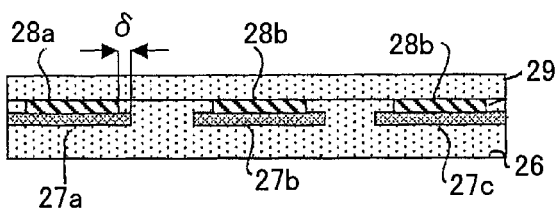

In this embodiment, the accuracy of the pattern of opaque regions defined in the optical element is determined by the accuracy of deposition of the regions 27a-27c of thermally switchable material. In embodiments in which heat from a heating element 28a-28c propagates in all directions, a slight misalignment between a heating element 28a and its respective region 27a of thermally switchable material will not affect the pattern of opaque regions defined in the optical element. This is illustrated in FIG. 13, which shows each heating element being narrower than its respective region 27a-27c of thermally switchable material, with there being a lateral misalignment δ between an edge of a region of thermally switchable material and an edge of the respective heating element. Even though each heating element 28a is narrower than its respective region 27a of thermally switchable material, the region of thermally switchable material 27a can be fully switched because heat from the heating element 28a dissipates in all directions.

Figure 14:
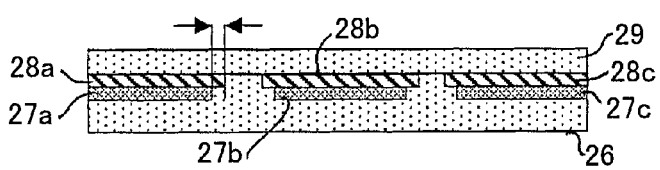

Conversely, if each heating element 28a-28c is made wider than its respective region of thermally switchable material, as shown in FIG. 14, this will have no effect on the pattern of opaque regions obtained in the optical element—since the opaque regions of the optical element are defined by the regions 27a-27c of thermally switchable material.

Figure 15:
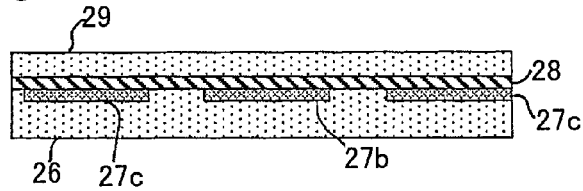

FIG. 15 is a schematic sectional view through a further optical element of the invention, in which the thermally switchable material is again provided as a plurality of discrete regions 27a-27c, and in which the heating element is applied as a uniform layer over substantially the entire area of the optical element. Again, the pattern of transparent regions defined in the optical element is determined by the regions 27a-27c of thermally switchable material. Since the heating element extends over substantially the entire area of the optical element, it is necessary for the thermally switchable material to be provided as a plurality of discrete regions in order for a desired arrangement of opaque regions (for example to form a parallax barrier) to be defined in the optical element.

It should be noted that, where an unpatterned heating element is provided as in FIG. 15, the area of the heating element is at a maximum. Moreover, current repartition within the heating element becomes a problem so that uniform generation of heat over the area of the heating element becomes difficult. Furthermore, the heating element releases heat in regions of the optical element where it is not required as no thermally switchable material is present. An unpatterned heating element therefore has a reduced heating efficiency and needs more input electrical power to overcome these difficulties.

In contrast, when a plurality of patterned heating elements is provided, the area of the heating elements is less than when an unpatterned heating element is provided over the entire area of the optical element. Moreover current repartition through the heating elements is improved, so that more uniform generation of heat over the area of the heating elements is possible. Also, the heating elements may be arranged such that they do not release heat in regions of the optical element where no thermally switchable material is present. Thus, in general, when a plurality of patterned heating elements are provided the required input electrical power will be less than when a single unpatterned heating element is provided over the area of the optical element.

Providing a plurality of patterned heating elements requires more fabrication steps than providing a single unpatterned heating element over the area of the optical element. Whether it is better to provide a plurality of patterned heating elements or a single unpatterned heating element would depend on the temperature to which the thermally switchable material must be heated—if this is low, a single unpatterned heating element may be provided so as to simplify the fabrication process at the cost of efficiency of the heating element. However, if the temperature to which the thermally switchable material must be heated is high it may be better to provide a plurality of patterned heating elements to obtain greater heating efficiency, at the expense of the additional fabrication steps required.

Figure 16:
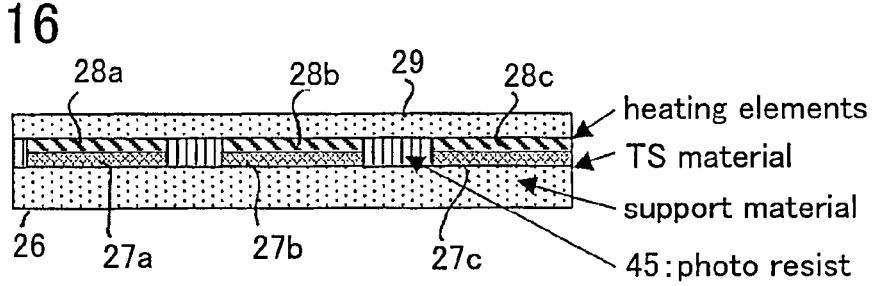

FIG. 16 shows an optical element according to a further embodiment of the present invention. This corresponds generally to the embodiment of FIG. 12, except that a transparent photoresist material 45 is disposed between adjacent regions 27a-27c of thermally switchable material and between adjacent heating elements 28a-28c. In this embodiment, the accuracy of the pattern of opaque regions that can be defined in the optical element is determined by the accuracy of patterning the regions 27a-27c of thermally switchable material—and this in turn is determined by the accuracy of the positions of the regions 45 of photoresist.

The embodiment of FIG. 16 may be manufactured by depositing a uniform photoresist layer over the support material 26, and then removing the photoresist from regions where it is intended to deposit the thermally switchable material. Thus, the accuracy of deposition of thermally switchable material is determined by the accuracy with which the photoresist layer is etched to define the blocks 36.

Figure 17:
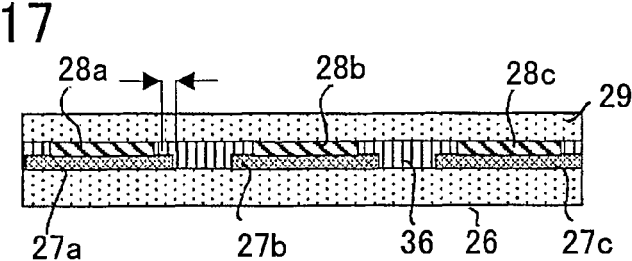
Figure 18:
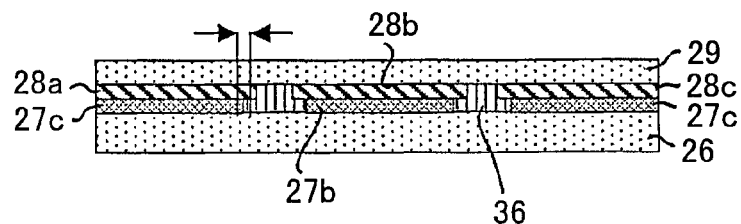

In this embodiment, the opaque regions defined in the optical element when the thermally switchable material is switched to its opaque state are determined by the regions of thermally switchable material, rather than by the heating elements 28a-28c. Any deformation of the regions of thermally switchable material, for example during the manufacturing process, so that their width does not correspond exactly to the width of the heating elements, as indicated in FIG. 17 or FIG. 18, will therefore have no effect on the accuracy of the pattern of opaque regions defined in the optical element when the thermally switchable material is switched.

Figure 19:
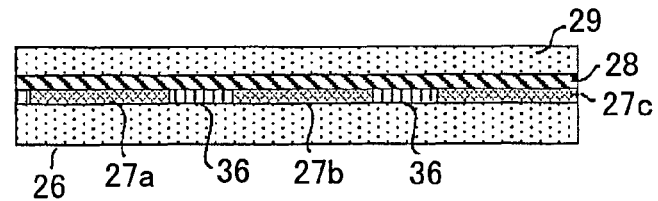

FIG. 19 illustrates a modification of the optical element of FIG. 16, in which the optical element comprises a single heating element 28 which extends over the entire area of the optical element. The regions of photoresist 45 have the same thickness of the regions 27a-27c of thermally switchable material. Again, the photoresist regions 45 must be positioned precisely, as their positions determine the positions of the thermally switchable material 27a-27c and in turn therefore determine the position of the opaque regions in the optical element when the thermally switchable material is switched.

In the embodiments described above, the optical element 20 is positioned in an optical path through a device such as, for example, a display, a backlight, or a reflector. Moreover, the heating elements 28, 28a-28c are themselves disposed in the optical path through the optical element. The heating elements 28, 28a-28c should therefore have as high an optical transmissivity as possible, to ensure that as little light as possible is absorbed in the heating elements. The heating elements are also required to be electrically resistive, so as to generate heat when a current flows through them. One family of materials suitable for use as the heating elements would be materials that are transparent and electrically resistive. An example of such materials is indium tin oxide (ITO). This material has the advantage that it can be patterned, and so is suitable for use in embodiments having patterned heating elements such as, for example, the embodiments of FIGS. 12-14.

A second family of materials suitable for use as the heating elements would be materials that are semi-transparent and electrically resistive. An example of such a material is a thin film of a metal of alloy, having a thickness such that its reflectivity is much lower than its transmissivity.

A third family of materials that are suitable for use as the heating elements would be materials that are electrically resistive and are opaque. These materials cannot, however, be deposited uniformly to define a heating element, but must be deposited in a regions that are sufficiently small that they cannot be perceived by the human eye. For example, microwires may be used—even though microwires are opaque, a plurality of microwires can be arranged in a pattern in which each microwire is sufficiently spaced from its neighbour that the microwires do not significantly degrade the transmissivity or optical quality of the optical element. As an example, microwires with a typical diameter of a few microns may be used. Typically, the maximum diameter of microwires that can be used without degrading the image quality or brightness of the display is around 10~20 microns. Again, the micro wires may be constituted of metal or a metal alloy.

Figure 20:
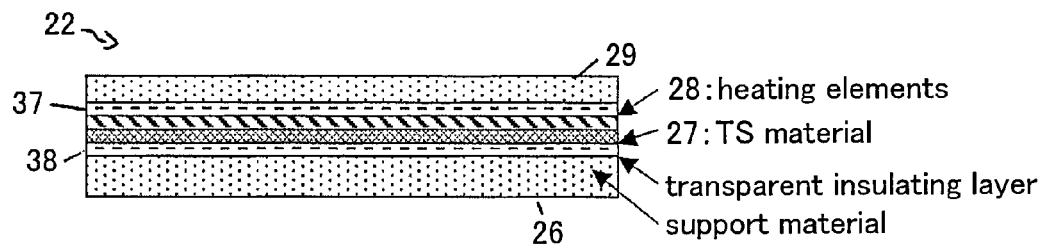

FIG. 20 is a schematic sectional view of a further optical element according to the present invention. In this embodiment, a first layer of transparent, thermally insulating material 38 is disposed between the support material 26 and the thermally switchable material 27, and a second layer of transparent thermally insulating material 37 is disposed between the heating element(s) 28 and the upper support material 29. This embodiment is suitable for use in applications in which there is a risk that heat generated by the heating element(s) could degrade components of another device to which the optical element is applied. Where an optical element of the invention is used in a display having a liquid crystal image display panel, as shown in FIG. 1 for example, there is a risk that heat generated by the heating element(s) could degrade the liquid crystal material or other components of the liquid crystal display panel. Providing the insulating material 37, 38 in the embodiment of FIG. 20 will serve to confine heat generated by the heating element(s) within the heating element(s) and the thermally switchable material, and will reduce the amount of heat that is transmitted out of the optical element.

The transparent thermally insulating material may be, for example, a transparent plastic material.

In FIG. 20, the thermally switchable material 27 and the heating element 28 are both shown as extending over substantially the entire area of the optical element. However, the transparent insulating laying 37, 38 may be applied to any embodiment of the present invention, for example to any one of the embodiments of FIGS. 1 to 19.

Depending on the intended application of the optical element, only one of the layers 37, 38 of transparent thermally insulating material shown in FIG. 20 need be provided. In an application as shown in FIGS. 1-3, for example, it would sufficient to provide the lower layer 38 of thermally insulating material, to prevent heat from the heating element(s) reaching the image display panel 21.

Figure 21:
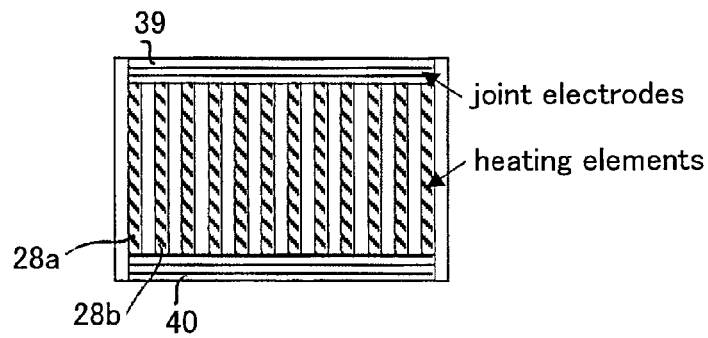
FIGS. 21 to 23 are schematic plan views of further optical elements according to the present invention.

In embodiments in which a plurality of heating element 28 is provided, it is desirable to ensure that each region of thermally switchable material receives substantially the same amount of heat from its respective heating element, to ensure that the regions of thermally switchable material are uniformly switched. This can be done, for example, electrically connecting the heating elements in parallel to one another so that each heating element receives the same current. This can be done as shown in FIG. 21 by connecting a first end of each heating element to an upper electrode 39, and connecting a second end of each heating element to a lower electrode 40. The upper and lower electrodes 39, 40 extend over opposing side strips of the optical element 20. The electrodes 39, 40 may be formed by depositing a metal layer onto the heating elements One example would be the deposition of gold to make the upper and lower electrodes 39,40. Another example, for the case of ITO heating elements, would be deposition of indium to form the upper and lower electrodes 39,40.

Figure 22:
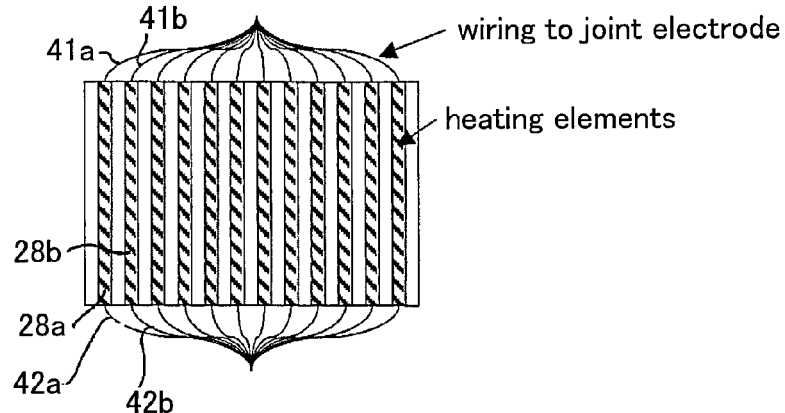

The heating elements 28a, 28b may alternatively be provided with wires 41a, 41a; 42a, 42b extending from their first and second ends respectively, with all the wires 41a, 41b extending from the first ends of the electrodes being electrically connected at a common point and with all the wires 42a, 42b extending from the second ends of the heating elements being electrically connected at a common point, shown in FIG. 22.

Figure 23:
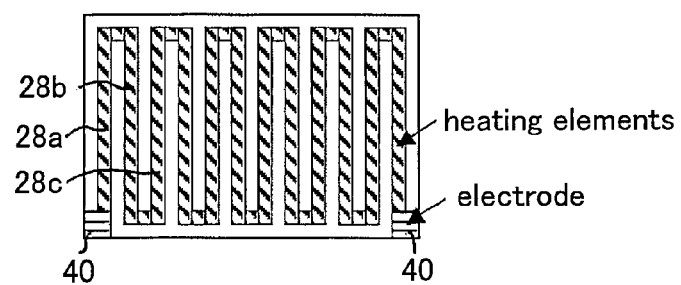

As a further example, the heating elements may be formed so as to define one continuous conductive element, for example having the "snake shape" shown in FIG. 23. The two ends of the continuous conductive element are connected to electrodes 39, 40. In the "snake shape" conductor of FIG. 23, first and second heating element 28a, 28b are electrically connected at their first ends, second and third heating elements 28b, 28c are electrically connected at the second ends, and so on.

The heating element(s) of an optical element of the present invention may be driven by any suitable drive system. In many cases it will be desired to heat up the heating element(s) for a defined period of time, so that the heating element(s) can provide a pulse of heat to the thermally switchable material. This in turn requires providing a pulse of a relatively high current to the heating element(s) during the defined period of time. As many electronic timing circuits provide a low output current, one suitable example of a drive circuit that can provide a current pulse to heating element(s) would be a capacitor discharge unit that discharges through the heating element(s) (which act(s) as a resistive load). The capacitor discharge unit would be charged up at a relatively low current and, once charged, would be discharged to provide a high current pulse for a defined time. In such an arrangement, the power that is dissipated into the heating element(s) is controlled by the voltage applied to the capacitor during its charge-up period, and the period of activation of the system depends on the time constant of the capacitor discharge unit which is related to the value of capacitance.

Figure 25:
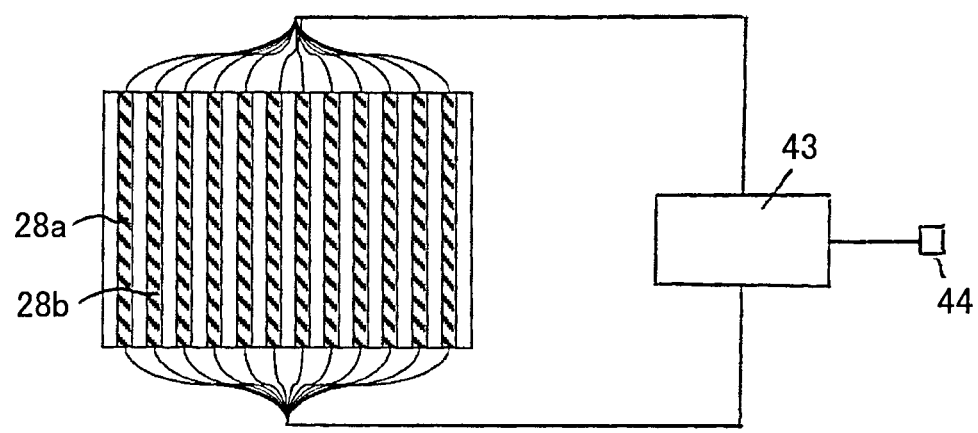
FIG. 25 is a schematic plan view of a further optical element according to the present invention.

Many applications of the present invention are envisaged, and in many applications the optical element will not be at a fixed ambient temperature but will be subject to fluctuations in ambient temperature. Where an optical element of the invention is used in an application that is not at a fixed ambient temperature, the heat required to be generated by the heating element(s) in order to switch the thermally switchable material may depend on the ambient temperature of the element. In a preferred embodiment, therefore, the heating element(s) is/are driven by a drive system 43 that varies the amount of electrical power provided to the heating element(s) in accordance with the ambient temperature. This is shown schematically in FIG. 25, in which the heating elements 28a, 28b are driven by a drive circuit 43 that receives an input from a temperature sensor 44. The drive circuit 43 varies the electrical power supplied to the heating elements 28a, 28b in accordance with the temperature as sensed by the temperature sensor 44. As an example, the temperature sensor 44 may be a thermistor, and the drive circuit 43 may detect a change of the resistance of the thermistor 44, and adjust the electrical power supplied to the heating elements 28a, 28b in accordance with the sensed resistance of the thermisitor 44, for example by varying the voltage applied to a capacitor discharge unit in accordance with the resistance of the thermistor. (FIG. 25 shows a plurality of heating elements, but this embodiment may be applied when only one heating element is present as shown, for example, in FIGS. 5-8 and 19.)

Figure 24:
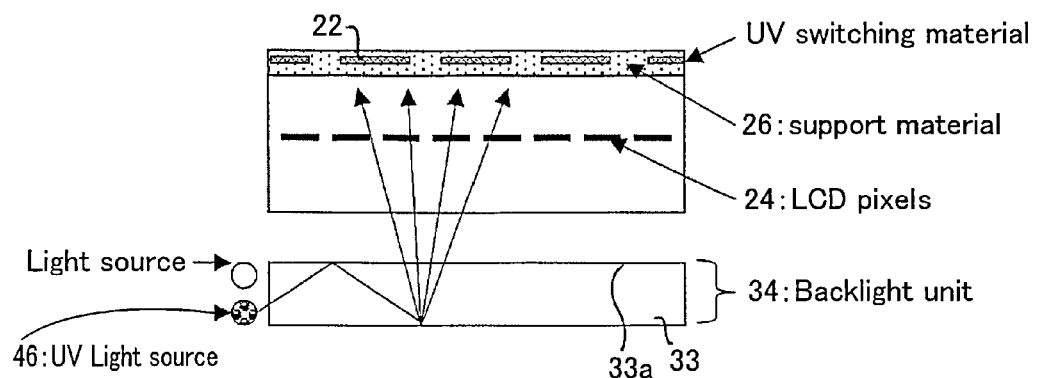
FIG. 24 is a schematic cross-sectional view of a further display according to the present invention.

In the embodiments of the invention described above, the switching means for switching the thermally switchable material comprise one or more electrical heating elements. The invention is not, however, limited to use of electrical heating elements as the switching means. As an example, FIG. 24 is a schematic sectional view of an optical element 20 according to a further embodiment of the present invention. In this embodiment, the optical element 20 comprises a thermally switchable material 27 disposed within a support material 26, but no electrical heating elements are provided. Instead, the switching means constitutes a radiation source 28 that, in use, can irradiate the thermally switchable material in order to heat it and therefore cause it to switch from its opaque state to its transparent state, or vice versa. In the embodiment of FIG. 24, the thermally switchable material 27 is sensitive to ultraviolet light, and the heating means 28 comprises a source of ultraviolet light—when the ultraviolet light source 46 is caused to emit ultraviolet light, the thermally switchable material 27 is heated up by the ultraviolet light and is caused to change its state.

FIG. 24 shows the optical element applied to an image display panel 21 that is lit by a backlight unit 34 of the general type described with reference to FIG. 4b above. The ultraviolet light 46 is disposed along one side edge face of the waveguide 33 of the backlight unit 34, so that, when the ultraviolet light 46 is illuminated, ultraviolet light is emitted from the front face 33a of the waveguide 33. However, the ultraviolet light source 46 does not need to be incorporated in a backlight unit in the manner shown in FIG. 24.

Use of an irradiation source to switch the thermally switchable material, as in FIG. 24, has the advantage that the drive circuitry for the light source 46 will, in general, be simpler than the drive circuitry needed to drive an array of electrical heating elements as in the embodiments of FIGS. 1-23 and 25.

The embodiment of FIG. 24 is not limited to a material that is thermally switchable so that the material is switched as a consequence of being heated by the pulse of radiation, but may in principle be applied with any material that may be changed from one stable state to another stable state with a different transmissivity upon irradiation with a pulse of radiation such as, for example, UV radiation, and that may be changed back to the first stable state upon irradiation with another pulse of radiation.

One example of a thermally switchable material that is suitable for use in the present invention would be a material containing a leuco dye as described by, for example, Ricoh Co. Ltd in "Rewritable Paper Using Leuco Dyes: Colouring/Decolouring effects of long-chain alkyl group", S. Yamamoto, IDW/AD '05, page 851 or U.S. Pat. No. 5,296,439. Leuco dyes change from a colourless state to a coloured state through a reversible reaction with an acidic compound, usually called a "developer". The above paper describes a developer having a long-chain alkyl group and intermolecular association groups to induce phase separation from a leuco dye through developer crystallisation.

By applying a heat pulse to a mixture of long-chain developer and leuco dye in a decoloured state, the mixture is converted to a melted-state mixture. Quenching the multistate mixture switches it to a solid-coloured state. If heat is applied to the solid-coloured state, to heat the mixture to a temperature less than the melting temperature, the developer returns to a stable crystallised state and the colour disappears which corresponds to a developer crystallisation. After cooling, the state of the mixture returns to the decoloured state. If the mixture is considered to be in the melted state, a slow cooling will incite the colour to eventually disappear. The cooling time of the mixture when it is in its melted-state will affect the arrangement between the leuco dyes and the developer: the quenching will organise them into an interdigitated structure corresponding to the mixture's black state. A slow cooling however will induce the developer to crystallize and the mixture to come back to its original transparent state.

The heat applied to a mixture of developer and leuco dye to convert it from a decoloured state to a melted-state may well be different from the temperature required to return the developer to a stable crystallised state. As one example, the mixture in a decoloured state may be converted to a melted state when heated to a temperature of 100° C., whereas heating the melted-state mixture to 80° C. may convert the developer back to a stable crystallised state. The drive circuit will preferably generate different heat pulses to drive the mixture to the two different temperatures required to convert the mixture from a decoloured state to a coloured state or vice versa. The easiest way to do this would be to change the voltage of the pulse, but keep the same pulse duration as this allows the discharge time to be kept constant in an embodiment in which the drive circuit has a capacitor discharge unit.

The temperatures required to switch a mixture of long-chain developer and leuco dye from its decoloured state to a solid-coloured state or vice versa may be changed by changing, for example, the nature of the developer.

A mixture of a leuco dye and a developer represents one material suitable for use as the thermally switchable material of the present invention. The invention is not, however, in principle limited to the specific choice of material. In principle, any material that has at least two stable states with different optical characteristics, and that can be thermally switched between these states, may be used as the thermally switchable material of the present invention (by a "stable state" it is meant that a thermal pulse is required to switch the material from one state to another but that the material, once switched, will stay in that state once the heat is removed, until such time as a further heat pulse is supplied to the material).

In embodiments in which it is desired to produce one or more opaque regions when the thermally material is switched, it is preferable that the opaque regions are substantially non-transmissive across the visible spectrum. In embodiments in which the thermally material is switched to obtain a parallax barrier, for example, the opaque regions of the parallax barrier are required to be opaque across the visible spectrum if directional display of colour images is to be achieved. In these embodiments, therefore, the thermally switchable material preferably contains two or more leuco dyes which exhibit their peak absorption at different wavelengths from one another so that a good black state may be obtained.

In embodiments in which the thermally switchable material is switched to provide a reduced but still non-zero transmissivity, such as the dimmable display of FIGS. 5 and 6 for example, it would in principle be possible to use a thermally switchable material containing a single leuco dye. This would however mean that the colour balance of a displayed image would change as the display was dimmed, and this may be unacceptable in some applications. It is therefore again preferable for the thermally switchable material to contains two or more leuco dyes which exhibit their peak absorption at different wavelengths from one another so that a good partially black state may be obtained.

Any suitable bistable material or multistable material having two or more stable states, of different characteristics, which can be thermally switched between one stable state and another, can in principle be used in an optical element of the present invention.

In the embodiments described above the thermally switchable material is switchable between states which provide different transmissivities for the optical element, for example to enable opaque regions to be defined or to allow a display or mirror to be dimmed. In other embodiments the thermally switchable material may alternatively be switchable between a state which provides a high light transmissivity for the optical element and a state in which the optical element appears coloured. In this example, the optical element may be used to allow the display of, for example, a mobile telephone to adopt the same colour as the body of the telephone when the display is switched off. Conventionally, when the display is switched off, it appears black and is visible to a user.

In such an embodiment, an optical element of the invention is disposed over the display of the mobile telephone. The optical element is such that the thermally switchable material extends uniformly over an area at least equal to the area of the display of the mobile telephone—preferably, the thermally switchable material is not patterned and extends uniformly over the active area of the optical element.

When the thermally rewritable material is in its maximally transparent state, the display of the mobile telephone is visible and has the same viewing properties as usual. However, when the thermal rewritable material is switched, the entire display is invisible from the user and the area where the display is located is coloured according to the colour properties of the leuco dyes. In this embodiment, the thermally switchable material is chosen to produce the same colour as the case of the telephone when switched, thereby making the display blend in with the case for aesthetic purposes. This embodiment may be effected using a mixture of leuco dye(s) and developer in which the leuco dye(s) in the mixture is/are chosen to produce the same colour as the case of the telephone when the mixture is switched.

In this embodiment, the optical element of the invention may cover the entire area of the display, so that the entire area of the display assumes the colour of the case when the thermally switchable material is switched. Alternatively, the optical element of the invention may cover only part of the area of the display. As an example, when a mobile telephone is in standby mode the display of the telephone normally displays the time, and it may be useful for a user still to be able to see the time. To effect this, the optical element may be arranged such that it does not cover that part of the display of the mobile telephone that displays the time so that, when the thermally switchable material is switched, a user will be able to read the displayed time even though the rest of the display has changed to be the same colour as the case.

This embodiment is not limited to a mobile telephone but may in principle be applied to any device having a display such as, for example, an IPOD® device.

In the above embodiments in which the invention is applied to a display, the display has been shown as a transmissive display. The invention is not however limited to a transmissive display and may be employed with, for example, an emissive display. Moreover, where the invention is applied to a transmissive display the thermally switchable material may be disposed either in front of the display or behind the display.

The invention has been described above with reference to a thermally switchable material that is bistable or multistable. This has the advantage that it is necessary to apply a heat pulse only when it is desired to switch the material from one state to another, thereby minimising the power required. In principle, however, the invention may be affected by a thermally switchable material that is not bistable or multistable, and in which the material is switched from one state to another by applying, and maintaining, heat. For example, leuco dyes are known that are not bistable or multistable. These dyes may be switched from one stable state to another state by applying heat, buy revert to the first stable state as soon as the heat is removed—so that heat must be applied for as long as it is desired to maintain the dye in the second state. In principle, the invention could be affected using such dyes.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical element comprising: a material thermally switchable between a first stable state and a second stable state different from the first stable state, wherein the material has a transmissivity different in the first stable state as compared to the second stable state; a switching mechanism for switching the transmissivity of one or more selected areas of the material between the first stable state and the second stable state thereby to change the a transmissivity in the visible spectrum of one or more selected areas of the optical element, wherein the material is bistable or multistable and has the first stable state and the second stable state as its two bistable states or as two of its multistable states, wherein the optical element is configured for use in a display that switches between a multi-view directional display mode and a single view display mode, and the switching mechanism switches between the first stable state and the second stable state to switch the display between the multi-view directional display mode and the single view display mode, and wherein, by applying a thermal pulse to the material once, the material is able to be maintained in the first stable state or in the second stable state until another thermal pulse is applied, even after the application of the thermal pulse is removed.

2. An optical element as claimed in claim 1 wherein the one or more selected areas of the optical element constitute less than the entire active area of the optical element.

3. An optical element as claimed in claim 1 wherein the one or more selected areas of the optical element constitute a plurality of stripe-shaped areas that extend generally parallel to one another.

4. An optical element as claimed in claim 3 and further comprising a lens array.

5. An optical element as claimed in claim 4, wherein the material is disposed substantially in a focal plane of the lens array.

6. An optical element as claimed in claim 4, wherein each lens of the lens array is laterally spaced from a respective selected area of the material.

7. An optical element as claimed in claim 1 wherein the switching mechanism for switching at least the selected area of the material is a heating mechanism for selectively heating the or each selected area of the material.

8. An optical element as claimed in claim 7 wherein the heating mechanism is in a fixed relationship to the material.

9. An optical element as claimed in claim 7 wherein the heating mechanism is provided in an optical path through the optical element.

10. An optical element as claimed in claim 7 wherein the heating mechanism is transparent or semi-transparent.

11. An optical element as claimed in claim 7 wherein the heating mechanism comprises a plurality of heating elements.

12. An optical element as claimed in claim 11 wherein each heating element is substantially co-extensive with a respective selected area of the material.

13. An optical element as claimed in claim 1 wherein the mechanism for switching the or each selected area of the material comprises a mechanism for irradiating the or each selected area of the material.

14. An optical element as claimed in claim 1 wherein the material is patterned thereby to define a plurality of selected areas of the material.

15. An optical element as claimed in claim 1 wherein the optical element is, for one of the first stable state and the second stable state of the material, transmissive.

16. An optical element as claimed in claim 15 wherein switching a selected area of the material from the first stable state to the second stable state reduces the transmissivity of a corresponding area of the optical element.

17. An optical element as claimed in claim 16 wherein the switching mechanism switches, in use, substantially the entire active area of the material.

18. An optical element as claimed in claim 15 wherein switching a selected area of the material from the first stable state to the second stable state reduces the transmissivity of a corresponding area of the optical element to substantially zero.

19. A display comprising: an image display panel; and an optical element as defined in claim 1 arranged in an optical path through the image display panel.

20. A reflector comprising: a light-reflective surface; and an optical element as defined in claim 1 arranged in an optical path to or from the light-reflective surface.

21. A backlight comprising an optical element as defined in claim 1.

22. A backlight as claimed in claim 21 and comprising a waveguide having a surface for emitting, in use, light; wherein the optical element is arranged in an optical path of light from the waveguide.

23. An optical element as claimed in claim 1 and comprising a drive circuit for driving the switching mechanism in accordance with the temperature of the optical element.

24. A display comprising: an image display panel; a material thermally switchable between a first state and a second state different from the first state disposed over at least part of the image display panel; and a switching mechanism for switching one or more selected areas of the material between the first state and the second state thereby to change a transmissivity in the visible spectrum of one or more selected areas of the material,
wherein the switching mechanism switches between the first stable state and the second stable state to switch image display panel between a multi-view directional display mode and a single view display mode, and
wherein, by applying a thermal pulse to the material once, the material is able to be maintained in the first stable state or in the second stable state until another thermal pulse is applied, even after the application of the thermal pulse is removed.

25. A display as claimed in claim 24 wherein the material is bistable or multistable and has the first state and the second state as its two stable states or as two of its stable states.

26. A display as claimed in claim 24 wherein the material has a first transmissivity in the first state and has a second transmissivity different from the first transmissivity in the second state.

27. A display as claimed in claim 24 wherein the one or more selected areas of the material correspond to less than the entire display area of the display.

28. A display as claimed in claim 24 wherein the one or more selected areas of the material constitute a plurality of stripe-shaped areas that extend generally parallel to one another.

29. A display as claimed in claim 28 and further comprising a lens array.

30. A display as claimed in claim 29, wherein the material is disposed substantially in a focal plane of the lens array.

31. A display as claimed in claim 29, wherein each lens of the lens array is laterally separated from a respective selected area of the material.

32. A display as claimed in claim 24 wherein the switching mechanism for switching the or each selected area of the material is a heating mechanism for heating the or each selected area of the material.

33. A display as claimed in claim 32 wherein the heating mechanism is in a fixed relationship to the material.

34. A display as claimed in claim 32 wherein the heating mechanism is provided in an optical path through the display.

35. A display as claimed in claim 32 wherein the heating mechanism is transparent or semi-transparent.

36. A display as claimed in claim 32 wherein the heating mechanism comprises a plurality of heating elements.

37. A display as claimed in claim 36 wherein each heating element is substantially co-extensive with a respective selected area of the material.

38. A display as claimed in claim 32 and further comprising a thermally insulating material disposed between the heating mechanism and the image display panel.

39. A display as claimed in claim 24 wherein the mechanism for switching the or each selected area of the material comprises a mechanism for irradiating the or each selected area of the material.

40. A display as claimed in claim 24 wherein the material is patterned thereby to define the or each selected area of the material.

41. A display as claimed in claim 24 wherein the material is, for the first state of the material, maximally light-transmissive.

42. A display as claimed in claim 41 wherein switching a selected area of the material from the first state to the second state reduces the transmissivity of a corresponding area of the material.

43. A display as claimed in claim 42 wherein the switching mechanism switches, in use, substantially the entire active area of the material.

44. A display as claimed in claim 41 wherein switching a selected area of the material from the first state to the second state reduces the transmissivity of a corresponding area of the material to substantially zero.

45. A display as claimed in claim 24 and comprising a drive circuit for driving the switching mechanism in accordance with the temperature of the display.

* * * * *